Oct. 31, 1939.   H. RIEPERT   2,178,361
COMBINED CAMERA AND EXPOSURE METER
Filed Oct. 10, 1936
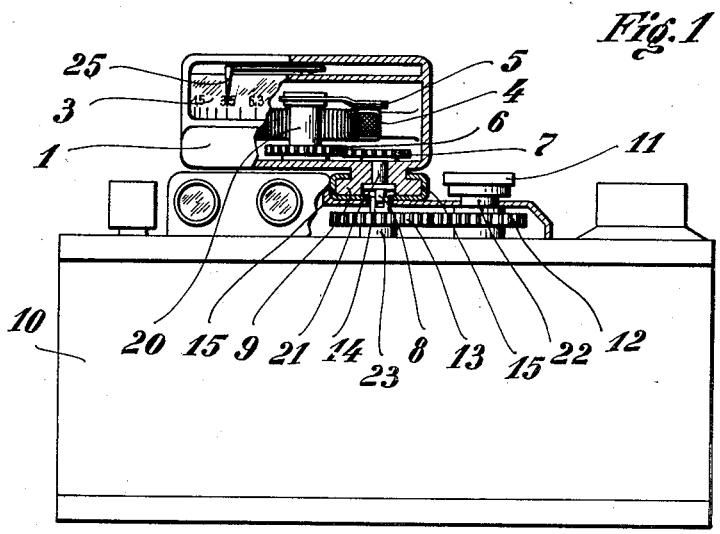
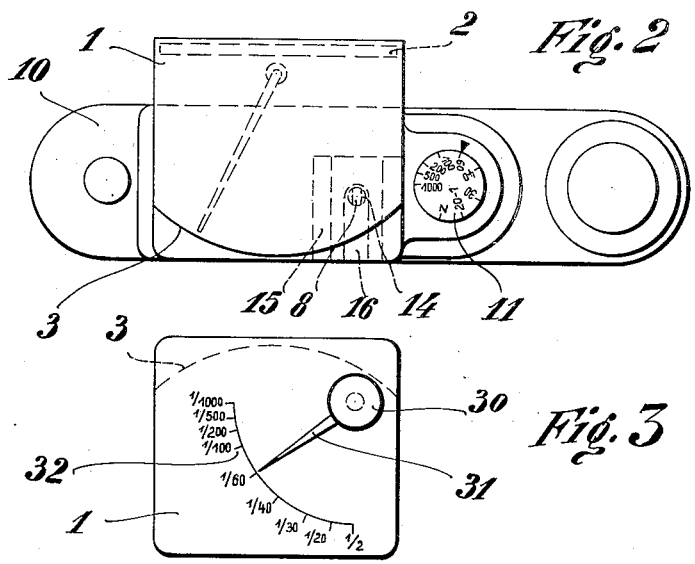
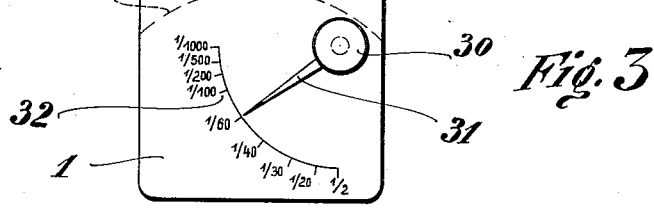
INVENTOR
Hermann Riepert
BY
Ivan E. A. Konigsberg
ATTORNEY Patented Oct. 31, 1939

2,178,361

UNITED STATES PATENT OFFICE 2,178,361

COMBINED CAMERA AND EXPOSURE METER

Hermann Riepert, Wetzlar, Germany, assignor to Ernst Leitz G. m. b. H., Wetzlar, Germany Application October 10, 1936, Serial No. 104,947
In Germany October 31, 1935

2 Claims. (Cl. 95—10)

This invention relates to photographic cameras and exposure meters therefor and has particular reference to improved cooperating coupling means on the camera and the exposure meter for automatically operatively connecting the exposure meter to the shutter setting member of the camera when the exposure meter is attached thereto.

At least two types of exposure meters are known to the art. Either the exposure meter is embodied in a separate apparatus to be used with but detached from the camera, or the exposure meter is built into a camera especially arranged for such purpose. Neither of the two types of exposure meters is adapted to be attached per se to cameras to be operated therewith in automatic cooperative relation, although it is obviously desirable to provide a camera so constructed that it may be used with or without an exposure meter, and correspondingly to provide an exposure meter adapted to be automatically operatively connected with the shutter setting member, or other member, of the camera. The use of a separate hand operated exposure meter includes the disadvantage that although correctly operated and read, the photographer may forget to set the camera to accord with the exposure meter.

The object of the invention is to provide a camera and an exposure meter with automatically functioning coupling members so arranged that the exposure meter is automatically operatively connected to the shutter setting member of the camera when the exposure meter is attached to the camera. A further object is to arrange the exposure meter for separate operation with a camera which is not constructed to receive the exposure meter in cooperative relation.

The invention is embodied in an exposure meter having means for automatically connecting the electrical resistance therein with the shutter setting member of the camera, and both the latter and the exposure meter are mechanically constructed for convenient attachment and detachment of the exposure meter. In addition, the exposure meter is arranged to be used as a separate apparatus with other types of cameras not having the aforesaid mechanical connecting means. The automatic coupling means may of course be arranged for coupling with some other member of the camera exposing or timing mechanism, for instance with the diaphragm adjusting member. This depends upon the particular camera construction as to which particular embodiment is to be preferred. Then again, both the shutter as well as the diaphragm adjusting or setting members may be arranged to be automatically connected with the exposure meter.

Accordingly the invention is embodied in a camera and exposure meter arranged and constructed as hereinafter set forth and as illustrated in the accompanying drawing in which Fig. 1 is a rear view in elevation of a camera with attached exposure meter according to the invention, with parts broken away and parts in section.

Fig. 2 is a top view of Figure 1.

Fig. 3 is a view of the exposure meter arranged for use as an independent apparatus.

In the drawing the reference numeral 1 denotes the exposure meter which contains a photo-electric cell 2, Fig. 2, an adjustable resistance 4 and a movable contact arm 5 for varying the resistance in a well known manner. The arm 5 is carried by a shaft 20. To the bottom of the latter there is secured a gear 6 which meshes with another gear 7 within the casing 1. The gear 7 is secured to the upper end of a shaft 21, the lower end of which extends through the exposure meter casing and forms a coupling member 8. The exposure meter casing is formed with a foot 9 adapted to be inserted into jaws 15, 15 formed on top of the camera casing 10.

The numeral 11 indicates the shutter setting knob of the camera. The knob is secured to the top of the shutter operating shaft 22 which carries a gear 12 in mesh with another gear 13 also carried by the camera upon another shaft 23. Above the gear 13, the shaft 23 forms a coupling member 14 adapted to receive the coupling member or pin 8 whereby to connect the resistance adjusting shaft 20 with the shutter shaft 22.

The exposure meter is connected to the camera by sliding the foot 9 into the jaws 15 and the latter is provided with a slot 16, Fig. 2, to permit the pin 8 to be slid into connection with the coupling member 14 on shaft 23. The back of the exposure meter is provided with the usual scale 3.

The connections between the shutter shaft and the shutter mechanism is not shown because such connection and operation is known in the art. The shutter setting knob 11 is sufficiently identified in Figure 2 by the scale thereon. It is not deemed necessary to enter into details concerning the use or operation of the exposure meter inasmuch as it is well known.

In operation the exposure meter is attached to the camera by first rotating the knob 11 to position the coupling member 14 so that it can receive and engage with the other coupling member 8 by sliding the exposure meter into position upon the camera. Thereafter the exposure meter is aimed at the object and the shutter knob rotated until it is positioned in the desired exposure position as indicated by its scale with reference to the fixed mark as seen in Fig. 2 in the usual manner. The rotation of the knob 11 causes rotation of the contact arm 5 via the train of gears as explained so that the resistance 4 is adjusted in a well known manner to correspond. The pointer 25 will then move in response to the operations of the photo-electric cell and indicate on the scale 3 the correct diaphragm opening to be used.

In Figure 3 the coupling member 8 is provided with a handle 30 having a pointer 31 which moves over a scale 32 so that the exposure meter may be used as such without being connected to the camera.

With this construction the photographer rotates the knob 30 and shaft 21 to adjust the resistance to accord with the position of the pointer 31 over the scale 32. Thereafter the correct diaphragm opening may be read on the scale 3 as explained above.

I claim:

1. A photographic apparatus including in combination a photographic camera and an exposure meter therefor, a variable electric resistance in the exposure meter, a member for varying said resistance, a coupling pin operatively connected to the said varying member and projecting from the exposure meter, a shutter speed regulating member on the camera, a coupling shaft operatively connected to the said regulating member and projecting from the camera, a flanged foot on the exposure meter, jaws on the camera for receiving the said foot whereby to connect the exposure meter to the camera by a sliding movement and a slot in the camera for receiving the said coupling pin of the exposure meter for automatically operatively connecting the said coupling pin and coupling shaft when the foot of the exposure meter is moved into position in the said jaws.

2. A photographic apparatus including in combination a photographic camera and an exposure meter therefor, said exposure meter including a variable resistance and a shaft accessible from outside the exposure meter for varying the resistance, said photographic camera including a member for determining the time exposure of said camera and a shaft projecting from the camera and operated by the said member, said exposure meter and camera having cooperating members on their outsides for detachably mounting the exposure meter upon the camera, the said two shafts having means for automatically connecting the same when the exposure meter is attached to the camera whereby to vary the said resistance in response to the operation of the said time exposure determining member.

HERMANN REIPERT.